United States Patent
Kuo et al.

[11] Patent Number: 6,090,902
[45] Date of Patent: Jul. 18, 2000

[54] ORGANOPOLYSILOXANE-MODIFIED GRAFT COPOLYMERS

[75] Inventors: Chung Mien Kuo; Donald Taylor Liles, both of Midland, Mich.

[73] Assignee: Dow Corning Corporation, Midland, Mich.

[21] Appl. No.: 09/218,535

[22] Filed: Dec. 21, 1998

[51] Int. Cl.[7] .................. C08F 130/08; C08F 230/08; C08F 30/08
[52] U.S. Cl. .................................................. 526/279
[58] Field of Search ............................................. 526/279

[56] References Cited

U.S. PATENT DOCUMENTS

| | | | |
|---|---|---|---|
| 3,644,306 | 2/1972 | Longi et al. | 260/80.71 |
| 4,028,483 | 6/1977 | Bond, Jr. et al. | 526/279 |
| 4,179,447 | 12/1979 | Bockstie, Jr. | 525/284 |
| 4,728,571 | 3/1988 | Clemens et al. | 428/352 |
| 4,981,903 | 1/1991 | Garbe et al. | 524/547 |
| 5,166,276 | 11/1992 | Hayama et al. | 525/329.7 |
| 5,241,035 | 8/1993 | Ono et al. | 528/26 |
| 5,276,095 | 1/1994 | Hoxmeier | 525/105 |
| 5,281,666 | 1/1994 | Hoxmeier | 525/105 |
| 5,296,574 | 3/1994 | Hoxmeier | 528/25 |
| 5,302,379 | 4/1994 | Sojka | 424/61 |
| 5,331,058 | 7/1994 | Shepherd et al. | 525/332.3 |
| 5,393,843 | 2/1995 | Handlin, Jr. et al. | 525/332.8 |
| 5,399,649 | 3/1995 | Okawa | 528/14 |
| 5,478,899 | 12/1995 | Bening | 526/84 |
| 5,480,946 | 1/1996 | Mueller et al. | 525/479 |
| 5,731,379 | 3/1998 | Kennan et al. | 524/806 |

FOREIGN PATENT DOCUMENTS

| | | |
|---|---|---|
| 0 412 704 | 2/1991 | European Pat. Off. . |
| 0 412 707 | 2/1991 | European Pat. Off. . |
| 59-126478 | 7/1984 | Japan . |
| WO 96-00562 | 1/1996 | WIPO . |

*Primary Examiner*—Margaret G. Moore
*Attorney, Agent, or Firm*—Timothy J. Troy

[57] ABSTRACT

This invention relates to organopolysiloxane-modified graft copolymers obtained by a method comprising heating a mixture comprising an ethylenically unsaturated monomer, a polyethylene-polybutylene macromonomer, an organopolysiloxane macromonomer, a free radical initiator, and optionally a solvent. The copolymers of this invention find utility in adhesives such as pressure sensitive adhesives, contact adhesives. laminating adhesives, and assembly adhesives, and release coatings.

28 Claims, No Drawings

ORGANOPOLYSILOXANE-MODIFIED GRAFT COPOLYMERS

FIELD OF THE INVENTION

This invention relates to organopolysiloxane-modified graft copolymers. More particularly this invention relates to organopolysiloxane-modified graft copolymers obtained by a method comprising heating a mixture comprising (A) an ethylenically unsaturated monomer, (B) a polyethylene-polybutylene macromonomer, (C) an organopolysiloxane macromonomer, (D) a free radical initiator, and (E) optionally a solvent.

BACKGROUND OF THE INVENTION

Copolymersor thermoplastic elastomers prepared by the anionic polymerization of conjugated dienes and/or styrenes are a unique class of thermoplastics. They differ fundamentally in polymeric structure such as linear copolymers, diblock, triblock, radial, and star polymer structure, and each block structure contributes unique properties to the polymer. These copolymers can be formulated with various other polymers and with a wide range of resins, solvents, and fillers. These copolymers find utility in coatings, adhesives, and sealants.

Copolymers having a functionalized endgroup which have been prepared utilizing anionic polymerization have been disclosed. For example Shepherd et al. in U.S. Pat. No. 5,331,058 discloses a process for anionically polymerizing a conjugated 1,3-diene monomer which consists of contacting the monomer in an inert hydrocarbon solvent with a monofunctional silyl ether initiator to yield a polydiene having a molecular weight of typically 1,000–10,000. It is further disclosed that the reactive ends of the polymer chains may be terminated with a reactive group such as hydroxyl by treating the polymer with ethylene oxide and that subsequent removal of the polymer's relatively unreactive silyl end groups by reaction with tetra-n-butylammoniumfluoride produces a difunctional, chain extendable, hydroxy terminated polydiene.

Handlin, Jr. et al. in U.S. Pat. No. 5,393,843 discloses hydrogenated butadiene polymers having terminal functional groups, such as hydroxyl groups, having a minimum viscosity at any molecular weight when the 1,2 addition is between 30 and 70%.

Bening in U.S. Pat. No. 5,478,899 discloses improved capping of anionic polymers to make functionalized polymers by using alkoxysilyl compounds having protected functional groups, such as acetal groups, as the capping agent. It is further disclosed that the protected functional groups are stable under a variety of conditions and then readily convert to more reactive terminal functional groups useful for making adhesives, sealants, and coatings.

Hydroxy functional poly(ethylene-butylene)is one of the materials that can be prepared by the anionic polymerization of butadiene and subsequent hydrogenation. The hydrogenation process produces a polymer having a saturated olefin backbone, a low viscosity, good water permeability, and good weatherability. The functionality in the poly(ethylene-butylene)polymer can be used in a variety of thermoset and thermoplastic applications. Also, this type of low viscosity, low molecular weight functionalized polymer which contains a polymerizable endgroup is a good macromonomer for use in graft polymerizations.

Silicone polymers also find utility in similar applications such as coatings, adhesives, and sealants where the polymers are often employed in the vulcanization process. Silicone polymers possess favorable properties such as low surface tension, excellent gas permeability, thermal stability, and resistance to ultraviolet light. Since silicone polymers are not miscible with other organic based polymers, distinct phase separation occurs readily for silicone polymers in blends of the two materials, especially when block copolymers or silicone graft copolymers are used. Several copolymers containing an organic polymer segment and a polydimethylsiloxane segment have been synthesized, both by block, star block, and graft polymerization. In block graft copolymerization where for example a polystyrene-polydimethylsiloxanes linear block copolymer is produced, styrene, a lithium initiator, and promoter are anionically polymerized with hexamethylcyclotrisiloxane or coupling of diblock copolymer to form a triblock copolymer.

Hoxmeier, in U.S. Pat. No. 5,276,095 disclose star block copolymers comprised of vinyl aromatic hydrocarbon and/or conjugated diene polymer arms and polydimethylsiloxane arms radiating outwardly from a polyalkenyl aromatic coupling agent core which is produced by first anionically polymerizing a vinyl aromatic hydrocarbon and/or a conjugated diene to produce living polymer arms, reacting the living polymer arms with a polyalkenyl aromatic coupling agent to couple the arms thereto, polymerizing this coupled product with hexamethylcyclotrisiloxane in the presence of a polar promoter, and then terminating the polymerization.

Clemens et al. in U.S. Pat. No. 4,728,571 discloses release coating compositions comprising polysiloxane-grafted copolymer and blends thereof with other polymeric materials which are useful on sheet materials and the backside of adhesive tapes.

U.S. Pat. No. 4,981,903 discloses a composition which can serve as a pressure sensitive or non-pressure sensitive adhesive composition at room temperature comprising a vinyl polymeric backbone with grafted pendant siloxane polymeric moieties.

European Patent Application No. 0412704 discloses hair care compositions comprising 0.1 to 10% of a copolymer having a molecular weight of 10,000 to 1,000,000 which has a vinyl polymeric backbone having grafted to it monovalent siloxane polymeric moieties, the copolymer comprising a silicone containing polymeric monomer and components selected from the group consisting of at least one free radically polymerizable vinyl monomer, and at least one reinforcing monomer copolymerizable with the vinyl monomer and from 0.5 to 99.5% of a carrier suitable for application to hair.

European Patent Application No. 0412707 discloses hair care compositions comprising 0.1 % to 10% of a silicone containing copolymer comprising a silicone-containing macromer having a weight average molecular weight of from 1,000 to 50,000 based on polydimethylsiloxane wand components selected from a lipophilic, low polarity free radically polymerizable vinyl monomer such as methacrylic or acrylic esters, a hydrophilic polar monomer which is copolymerizable with the vinyl monomer such as acrylic acid, dimethylaminoethylmethacrylate, or vinyl pyrrolidone, and mixtures thereof, and from 0.5% to 99.5% of a carrier suitable for application to hair.

Hayama et al. in U.S. Pat. No. 5,166,276 discloses a polymer suitable for use in hair care products comprising a unit of a hydrophilic ethylenically unsaturated monomer such as dimethylaminoethylmethacrylate in a quantity of 15 to 99.9% by weight, a unit of an ethylenically unsaturated monomer having a polysiloxane group in a quantity of 0.1 to 85% by weight, and a unit of an optional hydrophobic unsaturated monomer such as lauryl methacrylate in a quantity of 0 to 84.9% by weight.

Japanese Patent Publication No. 59126478 discloses a coating composition prepared by dissolving silicone graft copolymers prepared by the radical polymerization of a straight chain silicone high molecular weight monomer (I) and radically polymerizable monomer in a solution of film forming resin solvent wherein (I) comprises the reaction product of a living polymer prepared by the anionic polymerization of a cyclic siloxane.

Sojkain U.S. Pat. No. 5,302,379discloses a nail lacquer containing a film forming resin, a plasticizer, and a solvent wherein the film forming resin is a blend of (i) a graft copolymer having a main backbone chain of acrylic ester units and methacrylic ester units, with the main backbone chain having grafted thereto pendant trialkoxysilyl groups and pendant ethylene glycol dimethacrylate groups and (ii) silsesquioxane resin.

Hoxmeier in U.S. Pat. No. 5,281,666 discloses an improvement upon the process for making block copolymers of vinyl aromatic hydrocarbons and/or conjugated dienes, and polydimethylsiloxane by first anionically polymerizing the vinyl aromatic hydrocarbon to make a living polymer block and then adding hexamethylcyclotrisiloxane and a polar promoter to polymerize a polydimethylsiloxane block at the end of the living polymer block. The improvement comprises reacting the living polymer blocks with a crossover reagent to decrease the crossover time from the living polymer block polymerization to the polydimethylsiloxane polymerization.

Hoxmeier in U.S. Pat. No. 5,296,574 discloses a method for producing, in the presence of both monomers, a block copolymer of a polymer block of a vinyl aromatic hydrocarbon (and/or a conjugated diene) and a polydimethylsiloxane which comprises adding a vinyl aromatic hydrocarbon, an organo alkali metal promoter, hexamethylcyclotrisiloxane, and a polar promoter to a solvent, at a temperature of 0 to 60° C., allowing the polymerization of the vinyl aromatic hydrocarbon to proceed until the color of the vinyl aromatic hydrocarbon lithium ion species which is initially produced fades, then raising the temperature to 60 to 120° C. wherein the hexamethylcyclotrisiloxane polymerizes at the end of the polystyrene polymer blocks and then terminating the polymerization.

Unsaturated urea polysiloxanes have been disclosed in combination with copolymerizable comonomers. For example, Mueller et al. in U.S. Pat. No. 5,480,946 discloses styrene functional polysiloxanes which are obtained by the reaction of aminoalkyl functional polysiloxanes with styrene isocyanates. Mueller et al. further disclose that the styrene functional urea polysiloxanes have improved hydrolytic stability and are useful, either alone or in combination with copolymerizable monomers, in oxygen permeable coatings.

SUMMARY OF THE INVENTION

The present invention relates to organopolysiloxane-modified graft copolymers obtained by a method comprising heating a mixture comprising an ethylenically unsaturated monomer, a polyethylene-polybutylene macromonomer, an organopolysiloxane macromonomer, a free radical initiator, and optionally a solvent.

The present invention further relates to a method of making organopolysiloxane-modified graft copolymers comprising heating a mixture comprising an ethylenically unsaturated monomer, a polyethylene-polybutylene macromonomer, an organopolysiloxane macromonomer, a free radical initiator, and optionally a solvent.

Thus it is the purpose of this invention to make a polyacrylate resin graft copolymer using radically copolymerizable macromonomeric organopolysiloxanes and macromonomeric polyethylene-polybutylene.

It is another purpose of this invention to produce an acrylic silicone resin having long ethylene-butylenepolymeric grafts which can promote the miscibility of the acrylic resin in blending them with polyolefins and thereby make them suitable for making adhesives, release coatings, and personal care products.

DETAILED DESCRIPTION OF THE INVENTION

This invention relates to organopolysiloxane-modified graft copolymers obtained by a method comprising heating a mixture comprising (A) an ethylenically unsaturated monomer, (B) a polyethylene-polybutylene macromonomer, (C) an organopolysiloxane macromonomer,(D) a free radical initiator, and (E) optionally a solvent.

The ethylenically unsaturated monomer (A) must be copolymerizable with components (B) and (C) below. Component (A) is exemplified by alkyl acrylates such as by methyl acrylate, ethyl acrylate, butyl acrylate, propyl acrylate, pentyl acrylate, hexyl acrylate, octyl acrylate, 2-ethylhexyl acrylate, nonyl acrylate, decyl acrylate, dodecyl acrylate, tetradecyl acrylate, and hexadecyl acrylate and by alkyl methacrylates such as methyl methacrylate, ethyl methacrylate, propyl methacrylate, isopropyl methacrylate, n-butyl methacrylate, isobutyl methacrylate, sec-butyl methacrylate, t-butyl methacrylate, n-hexyl methacrylate, n-octyl methacrylate, isooctyl methacrylate, 2-ethylhexyl methacrylate, n-decyl methacrylate, tetradecyl methacrylate, n-vinyl pyrrolidone, and combinations thereof.

Preferably the ethylenically unsaturated monomer (A) is n-vinyl pyrrolidone or has the formula:

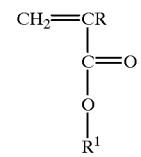

wherein R is hydrogen or an alkyl group, $R^1$ is an alkyl group having from 1 to 20 carbon atoms exemplified by methyl, ethyl, propyl, butyl, pentyl, hexyl, octyl, decyl, dodecyl, and octadecyl. Preferably R is hydrogen or methyl and $R^1$ is selected from the group consisting of methyl, ethyl, propyl, and butyl.

Generally, component (A), the ethylenically unsaturated monomer, is present in an amount of from about 20 to about 90 weight percent, and preferably from 40 to 80 weight percent, said weight percent being based on the total weight of the formulation.

Component (B) is a polyethylene-polybutylene macromonomer. The polyethylene-polybutylene macromonomer (B) preferably has formula:

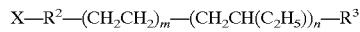

wherein X is an acryloyl terminated urethane group, $R^2$ is a divalent hydrocarbon group having from 1 to 20 carbon atoms, $R^3$ is an alkyl group having from 1 to 10 carbon atoms, and the value of m+n is from 10 to 500, and preferably from 20–200. The acryloyl terminated urethane group of X is preferably a group having the formula

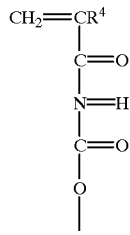

wherein $R^4$ is hydrogen or an alkyl group. The alkyl groups are as delineated above for $R^1$. Preferably $R^4$ is hydrogen or methyl.

The divalent hydrocarbon group $R^2$ is exemplified by alkylene groups such as methylene, ethylene, —CH$_2$CH(CH$_3$)—, propylene —CH$_2$CH(CH$_3$)CH$_2$—, butylene pentylene, trimethylene, 2-methyltrimethylene, pentamethylene, hexamethylene, 3-ethyl-hexamethylene, octamethylene, —((CH$_2$)$_{18}$—, and cycloalkylene radicals such as cyclohexylene, arylene radicals such as phenylene, combinations of divalent hydrocarbon radicals such as benzylene (—C$_6$H$_4$CH$_2$—), and alkyleneoxyalkylene groups exemplified by —CH$_2$—O—CH$_2$—, —CH$_2$—O—CH$_2$CH$_2$—O—CH$_2$CH$_2$—, —CH$_2$CH$_2$CH$_2$—O—CH$_2$—, —CH$_2$CH$_2$OCH(CH$_3$)CH$_2$—, —CH$_2$OCH$_2$CH$_2$OCH$_2$CH$_2$—, —CH$_2$OCH$_2$CH$_2$OCH$_2$CH$_2$CH$_2$—. Preferably $R^2$ is selected from the group consisting of ethylene, propylene, and butylene.

The alkyl groups $R^3$ are exemplified by methyl, ethyl, propyl, butyl, pentyl, hexyl, octyl, and decyl. Preferably $R^3$ is selected from the group consisting of methyl, ethyl, propyl, and butyl.

Preferably the polyethylene-polybutylene macromonomer has the formula:

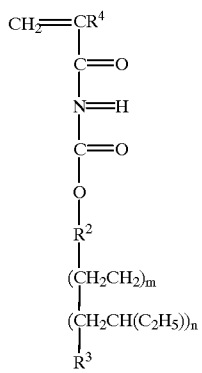

wherein $R^2$, $R^3$, $R^4$, m, and n are as defined above. Preferably, $R^2$ is selected from the group consisting of ethylene, propylene, and butylene, $R^3$ is selected from the group consisting of methyl, ethyl, propyl, n-butyl, sec-butyl, and tert-butyl, $R^4$ is hydrogen or methyl, and the value of m+n is from 20 to 200.

Generally, component (B), the polyethylene-polybutylene macromonomer, is present in amount from about 5 to about 50 weight percent, and preferably from 10 to 30 weight percent, said weight percent being based on the total weight of the formulation.

Component (C), the organopolysiloxane macromonomer is exemplified by acryloxyalkyl-functional organopolysiloxanes, methacryloxyalkyl-functional organopolysiloxanes and isopropenylbenzyl dialkyl urea-functional organopolysiloxanes. Preferred organopolysiloxanes are exemplified by compounds having the formula:

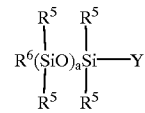

wherein $R^5$ is an alkyl group as delineated above for $R^1$, $R^6$ is an alkyl group having from 1 to 10 carbon atoms, a has a value of at least 1, preferably at least 3 and more preferably at least 10 and Y is selected from the group consisting of an acryloxyalkyl group, a methacryloxyalkyl group, and an isopropenylbenzyl dialkyl urea group. Preferably $R^5$ is methyl, and $R^6$ is selected from the group consisting of methyl, ethyl, propyl, n-butyl, sec-butyl, and tert-butyl.

Preferably Y is a group having the formula

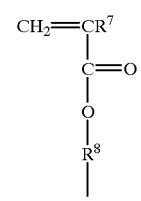

wherein $R^7$ is hydrogen or an alkyl group as delineated above for $R^1$, and $R^8$ is a divalent hydrocarbon group as delineated above for $R^2$. Preferably $R^7$ is hydrogen or methyl, and $R^8$ is selected from the group consisting of ethylene, propylene, and butylene. Preferably Y is selected from the group consisting of 3- methacryloxypropyl,3-acryloxypropyl,and 3-isopropenylbenzyl dimethyl urea.

Preferably the organopolysiloxane macromonomer(C) has the formula:

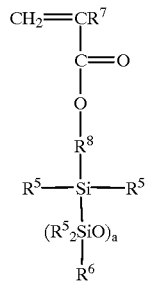

wherein $R^5$, $R^6$, $R^7$, $R^8$ and a are as defined above. Preferably $R^5$ is methyl, $R^6$ is selected from the group consisting of methyl, ethyl, propyl, n-butyl, sec-butyl, and tert-butyl. $R^7$ is hydrogen or methyl, $R^8$ is selected from the group consisting of ethylene, propylene, and butylene, and a has a value of 1 to 300.

Generally, component (C), the organopolysiloxane macromonomer, is present in an amount from about 0.5 to about 20 weight percent, and preferably from 5 to 10 weight percent, said weight percent being based on the total weight of the formulation.

Component (D) in this invention is a free radical initiator. Suitable free radical initiators are exemplified by peroxide initiators, azo initiators, redox intitiators, and photochemical initiators. The peroxide initiators are exemplified by diacyl peroxides, peroxyesters, dialkyl peroxides, and peroxydicarbonates. Especially preferred peroxide initiators are exemplified by dibenzoyl peroxide, t-butyl peroctoate, dicumyl peroxide, diisopropyl peroxydicarbonate, and a preferred azo initiator is 2,2-azobisisobutyronitrile.

Generally, component (D), the free radical initiator, is present in an amount from about 0.05 to about 5 weight percent, and preferably from 0.1 to 1 weight percent, said weight percent being based on the total weight of the formulation.

The optional component (E), the solvent, is exemplified by aliphatic hydrocarbons such as pentane, hexane, heptane, octane, and nonane, aromatic hydrocarbons such as benzene, toluene, and xylene; ketones such as acetone, methylethyl ketone, and methylisobutyl ketone, and halogenated diluents such as fluorine-, chlorine-, and bromine-, substituted aliphatic or aromatic hydrocarbons such as trichloroethane, perchloroethylene, bromobenzene, and the like. Two or more solvents may be used together. The solvent is preferably selected from the group consisting of benzene, toluene, and xylene.

The amount of solvent is not critical and may be readily determined by one skilled in the art. Generally, component (E), the solvent, is present in an amount of up to 1000 parts by weight, and preferably from 100 to 300 parts by weight, per 100 parts by weight of components (A)–(D).

The temperature at which the mixture of components (A)–(D) and optionally (E) is heated is dependent on the type of catalyst that is selected. However, it is preferred for purposes of this invention that the mixture of components (A)–(D) and optionally (E) is heated at a temperature of at least 50° C. and preferably from about 50° C. to about 100° C.

This invention further relates to a method of making organopolysiloxane-modified graft copolymers comprising heating a mixture comprising (A) an ethylenically unsaturated monomer, (B) a polyethylene-polybutylene macromonomer, (C) an organopolysiloxane macromonomer, (D) a free radical initiator, and (E) optionally a solvent. Components (A)–(E) are as delineated above including preferred embodiments thereof and amounts thereof, and the temperature at which components (A)–(E) are heated is as delineated above including preferred embodiments thereof.

The organopolysiloxane-modified graft copolymers of the present invention promote are miscible when blended with polyolefins and it is believed that the copolymers of this invention will show more surface lubricity (low friction) than do copolymers which do not contain polydimethylsiloxane grafts. The copolymers of this invention find utility in adhesives (including pressure sensitive adhesives, contact adhesives laminating adhesives, and assembly adhesives) and release coatings.

The instant invention will be explained in greater detail below through working examples. In the examples, parts indicates weight parts Mn is an abbreviation for number-average molecular weight, and Mw is an abbreviation for weight-average molecular weight, both Mn and Mw were measured by GPC based on polystyrene linear polymer standards.

EXAMPLES

The following materials were prepared:

An omega-methacryloxypropyl terminated polydimethylsiloxane was prepared in the following manner: 100 grams (g) of hexamethylcyclotrisiloxane was dissolved in 150 (g) of xylene in a 500 ml 3-necked flask. This mixture was stirred under nitrogen at room temperature. This mixture was then subjected to a silylation treatment using trimethylchlorosilane and n-butyl lithium as described by Okawa in U.S. Pat. No. 5.399,649 to remove water or silanol impurities from hexamethylcyclotrisiloxane. A syringe containing 2.4 (g) of trimethylsilanol was then added to the mixture. The reaction was then started by adding 8 (g) of dimethylformamide to the mixture and the mixture was then stirred at room temperature. When the degree of conversion of hexamethylcyclotrisiloxane was greater than 85%, a 10 mole percent excess of the capping agent, methacryloxypropyl-dimethylchlorosilanewas introduced into the mixture, and the reaction was maintained at 25° C. for 3 hours. The polymer was obtained from solution by stripping and filtration. The resulting polymer was a omega-methacryloxypropyl-terminated polydimethylsiloxane having a degree of polymerization of about 120.

Omega-methacryloyl urethane terminated poly(ethylene-butylene)was prepared as follows: This material was prepared according to the disclosure of U.S. Pat. No. 5,478,899 which discloses a process which comprises the anionic polymerization of 1,3-butadiene using a mono-lithium initiator and terminating the polymerization step by the addition of an alkoxy silyl compound. The end group of the polybutadiene was then converted to hydroxyl functionality with acid and the unsaturated diene in the polymer backbone was further hydrogenated. Next, 40 (g) of the omega-hydroxyl terminated poly(ethylene-butylene)compound was reacted with 1.4 (g) of methacryloyl isocyanate in the presence of a few drops of stannous octoate catalyst at a temperature of 60° C. for 4 hours to produce omega-methacryloyl urethane terminated poly(ethylene-butylene). Excess methacryloyl isocyanate was then reacted with a few drops of water. Next, the polymer was dissolved in hexane and the solution stirred under activated carbon to remove color from the solution. After the solvent was removed by filtration, molar mass analysis showed that the omega-methacryloyl urethane terminated poly(ethylene-butylene) had a molecular weight (Mn) of 7112 and a Mw/Mn of 1.08 based on GPC analysis using a polystyrene standard for the molecular weight calibration.

An alpha secondary amino terminated polydimethylsiloxane was prepared as follows: an alpha-hydroxyl-terminated polydimethylsiloxane having a number average molecular weight of about 10,000 was prepared by the anionic polymerization of hexamethylcyclotrisiloxanes taught by Okawa in U.S. Pat. No. 5.399.649. The alpha-hydroxyl-terminated polydimethylsiloxane was then reacted with a 10 mol % excess amount of cyclic organosilylamine (1,2,3,4-tetramethyl-aza-2-silacyclopentane) at room temperature to form alpha secondary amino terminated polydimethylsiloxane.

Comparative Example 1

About 32 (g) of ethyl acrylate, 8 (g) of the omega-methacryloylurethane terminated poly(ethylene-butylene) compound prepared above, and 65 (g) of toluene were placed in a 250 ml 3-necked flask equipped with a thermometer, a mechanical stirrer, a nitrogen inlet tube and a reflux condenser. After bubbling with nitrogen for about 15 minutes, about 0.25 weight percent of an initiator, VAZOCR®-64 (2,2-azobisisobutyronitrile from E.I. DuPont Co., Wilmington, Del.), the weight percent being based on the weight of the ethyl acrylate (the co-monomer), was added to the mixture. The flask was then placed in a silicone oil bath at 65° C. under a nitrogen atmosphere for 24 hours. After the polymerization, the resulting copolymer was recovered out of the solvent. The resulting compound was a graft copolymer containing poly(ethyl acrylate) segments and a urethane functional poly(ethylene-butylene)graft, the graft copolymer having a number average molecular weight (Mn) of 106,500 and an Mw/Mn of 2.84.

Example 1

In a 250 ml 3-necked flask, 35 (g) of 2 ethylhexyl acrylate, 7.5 (g) of the omega-methacryloxypropyl-terminated polydimethylsiloxane prepared above, and 7.5 (g) of the omega-methacryloyl urethane-terminated poly(ethylene-butylene) prepared above, 75 (g) of toluene, and 0.1 (g) of VAZO®-64 (2,2-azobisisobutyronitrile from E.I. DuPont Co., Wilmington, Del.) were added. The mixture was heated in a 70° C. oil bath under a nitrogen atmosphere with stirring for 24 hours. The reaction was then terminated by allowing the flask to cool to room temperature. The resultant polymer solution poured into methanol and the highly viscous polymer was recovered by evaporation of solvent under reduced pressure. The resulting compound was a graft copolymer containing poly(2-ethylhexyl acrylate) segments, a urethane functional poly(ethylene-butylene)graft, and a methacryloxypropyl functional polydimethylsiloxane graft, the graft copolymer having a number average molecular weight (Mn) of 40,150 and an Mw/Mn of 4.528.

Example 2

To a 250 ml 3-necked flask was added 70 parts of methyl acrylate, 15 parts of the omega-methacryloxypropyl-terminated polydimethylsiloxane prepared above, 15 parts of the omega-methacryloylurethane-terminated poly (ethylene-butylene), 250 parts of toluene, and 0.15 parts of VAZO®-64 (2,2-azobisisobutyronitrile from E.I. DuPont Co., Wilmington. Del.) were added. The mixture was heated in a 70° C. oil bath under a nitrogen atmosphere with stirring for 24 hours. The reaction was then terminated by allowing the flask to cool to room temperature. The resultant polymer solution poured into methanol and the highly viscous polymer was recovered by evaporation of solvent under reduced pressure. The resulting compound was a graft copolymer containing poly(methyl acrylate) segments, a urethane functional poly(ethylene-butylene)graft, and a methacryloxypropyl functional polydimethylsiloxane graft, the graft copolymer having a number average molecular weight (Mn) of 45,150 and an Mw/Mn of 3.33.

Example 3

A 3 -isopropenylbenzyl dimethyl urea-terminated polydimethylsiloxane macromonomer having a molecular weight of about 10,000 was prepared. A 100 ml two necked flask was charged with 62.23 (g) of the alpha secondary amino terminated polydimethylsiloxane prepared above. Next, moisture was removed from the flask by drying the material on a vacuum line for about an hour. The flask was pressurized with nitrogen and a 10 mole percent excess of 3-isopropenyl benzyl dimethyl isocyanate was introduced to the reaction flask through a rubber septum. The flask contents were maintained at 25° C. and stirred with a magnetic stirrer. Analysis using gas phase chromatography showed more than 96% of the 3-ispropenyl benzyl dimethyl isocyanate converted after 12 hours of mixing. The excess amount of 3-isopropenyl benzyl dimethyl isocyanate was reacted with a few drops of water. The mixture was then stripped under vacuum at 70° C. to remove excess isocyanate. The resulting polydimethylsiloxane was a clear liquid linear polymer. $^{13}$C-NMR spectra of polymer showed the isocyanate group (123.4 ppm) converted to urea (158.3 ppm). Gel permeation chromatography (GPC) revealed a number average molecular weight (Mn) of 10.460 and a weight average molecular weight (Mw) of 11,510 based on calibration against polystyrene standards.

To a 250 ml 3-necked flask was added 70 parts of n-vinyl pyrrolidone, 15 parts of the 3-isopropenylbenzyldimethyl urea terminated polydimethylsiloxane prepared above, 15 parts of the urethane functional poly(ethylene-butylene) prepared above, 250 parts of toluene, and 0.15 parts of VAZO®-64 (2,2-azobisisobutyronitrile from E.I. DuPont Co., Wilmington, Del.). The mixture was heated in a 70° C. oil bath under a nitrogen atmosphere with stirring for 24 hours. The reaction was then terminated by allowing the flask to cool to room temperature. The resultant polymer solution poured into methanol and the highly viscous polymer was recovered by evaporation of solvent under reduced pressure. The resulting compound was a graft copolymer containing a poly(n-vinyl pyrrolidone) segment, a 3-isopropenylbenzyldimethyl urea functional polydimethylsiloxane graft, and a urethane functional poly(ethylene-butylene)graft. The graft copolymer had a number average molecular weight (Mn) of 163,000 and an Mw/Mn of 4.0.

That which is claimed is:

1. An organopolysiloxane-modified graft copolymer obtained by a method comprising heating a mixture comprising:
   (A) an ethylenically unsaturated monomer;
   (B) a polyethylene-polybutyulene macromonomer;
   (C) an organopolysiloxane macromonomer;
   (D) a free radical initiator; and
   (E) optionally a solvent.

2. A copolymer according to claim 1, wherein (A) is selected from the Group consisting of methyl acrylate, ethyl acrylate, butyl acrylate, propyl acrylate, pentyl acrylate, hexyl acrylate, octyl acrylate, 2-ethylhexyl acrylate, nonyl acrylate, decyl acrylate, dodecyl acrylate, tetradecyl acrylate, hexadecyl acrylate, methyl methacrylate, ethyl methacrylate, propyl methacrylate, isopropyl methacrylate, n-butyl methacrylate, isobutyl methacrylate, sec-butyl methacrylate, t-butyl methacrylate, n-hexyl methacrylate, n-octyl methacrylate, isooctyl methacrylate, 2-ethylhexyl methacrylate, n-decyl methacrylate, tetradecyl methacrylate, n-vinylpyrrolidone, polyacrylic acid, polymethylacrylic acid, and combinations thereof.

3. A copolymer according to claim 1, wherein (A) is n-vinylpyrrolidone or an ethylenically unsaturated monomer having the formula

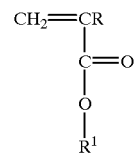

wherein R is hydrogen or methyl and $R^1$ is selected from the group consisting of methyl, ethyl, propyl, and butyl.

4. A copolymer according to claim 1, wherein (B) is a polyethylene-polybutylene macromonomer having the formula:

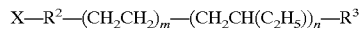

wherein X is an acryloyl terminated urethane group, $R^2$ is a divalent hydrocarbon group having from 1 to 20 carbon atoms, $R^3$ is an alkyl group having from 1 to 10 carbon atoms, and the value of m+n is from 10 to 100.

5. A copolymer according to claim 4, wherein X is a group having the formula

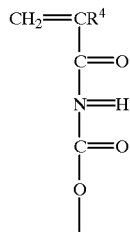

wherein $R^4$ is hydrogen or an alkyl group.

6. A copolymer according to claim 1, wherein (B) is a polyethylene-polybutylene macromonomer having the formula:

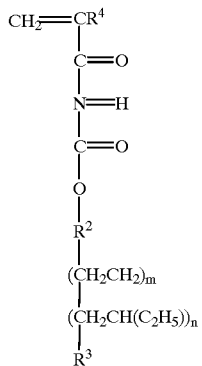

wherein $R^2$ is selected from the group consisting of ethylene, propylene, and butylene, $R^3$ is selected from the group consisting of methyl, ethyl, propyl, n-butyl, sec-butyl, and tert-butyl, $R^4$ is hydrogen or methyl, the value of m+n is from 20 to 200.

7. A copolymer according to claim 1, wherein (C) is selected from the group consisting of acryloxyalkyl-functional organopolysiloxanes, methacryloxyalkyl-functional organopolysiloxanes, and isopropenylbenzyl dialkyl urea-functional organopolysiloxanes.

8. A copolymer according to claim 1, wherein (C) is an organopolysiloxane having the formula:

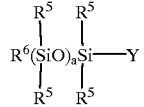

wherein $R^5$ is an alkyl group having from 1 to 20 carbon atoms, $R^6$ is an alkyl group having from 1 to 10 carbon atoms, a has a value of at least 1, and Y is selected from the group consisting of an acryloxyalkyl group, a methacryloxyalkyl group, and an isopropenylbenzyl dialkyl urea group.

9. A copolymer according to claim 8, wherein Y is a group having the formula

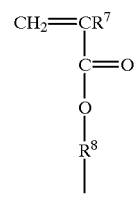

wherein $R^7$ is hydrogen or an alkyl group and $R^8$ is a divalent hydrocarbon group having from 1 to 20 carbon atoms.

10. A copolymer according to claim 1, wherein (C) is an organopolysiloxane shaving the formula:

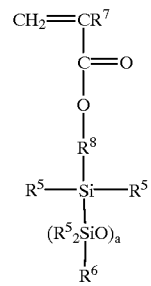

wherein $R^5$ is methyl, $R^6$ is selected from the group consisting of methyl, ethyl, propyl, n-butyl, sec-butyl, and tert-butyl, $R^7$ is hydrogen or methyl, $R^8$ is selected from the group consisting ethylene, propylene, and butylene, and a has a value of 1 to 300.

11. A copolymer according to claim 1, wherein (D) is selected from the group consisting of peroxide initiators, azo initiators, redox intitiators, and photochemical initiators.

12. A copolymer according to claim 11, wherein the peroxide initiator is selected from the group consisting of dibenzoyl peroxide, t-butyl peroctoate, dicumyl peroxide, di isopropyl peroxydicarbonate, and the azo initiator is 2,2-azobisisobutyronitrile.

13. A copolymer according to claim 1, wherein (E) is selected from the group consisting of pentane, hexane, heptane, octane, nonane, benzene, toluene, xylene, acetone, methylethyl ketone, methylisobutyl ketone, trichloroethane, perchloroethylene, and bromobenzene.

14. A copolymer according to claim 1, wherein the method comprises heating the mixture at a temperature 50 to 100° C.

15. A method of making an organopolysiloxane-modified graft copolymer comprising heating a mixture comprising:
(A) an ethylenically unsaturated monomer;
(B) a polyethylene-polybutylene macromonomer;
(C) an organopolysiloxane macromonomer;
(D) a free radical initiator; and
(E) optionally a solvent.

16. A method according to claim 15, wherein (A) is selected from the group consisting of methyl acrylate, ethyl acrylate, butyl acrylate, propyl acrylate, pentyl acrylate, hexyl acrylate, octyl acrylate, 2-ethylhexyl acrylate, nonyl acrylate, decyl acrylate, dodecyl acrylate, tetradecyl acrylate, hexadecyl acrylate, methyl methacrylate, ethyl methacrylate, propyl methacrylate, isopropyl methacrylate, n-butyl methacrylate, isobutyl methacrylate, sec-butyl methacrylate, t-butyl methacrylate, n-hexyl methacrylate, n-octyl methacrylate, isooctyl methacrylate, 2-ethylhexyl methacrylate, n-decyl methacrylate, tetradecyl methacrylate, n-vinylpyrrolidone, polyacrylic acid, polymethylacrylic acid, and combinations thereof.

17. A method according to claim 15, wherein (A) is n-vinylpyrrolidone or an ethylenically unsaturated monomer having the formula

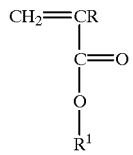

wherein R is hydrogen or methyl and $R^1$ is selected from the group consisting of methyl, ethyl, propyl, and butyl.

18. A method according to claim 15, wherein (B) is a polyethylene-polybutylene macromonomer having the formula:

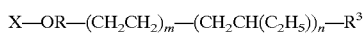

wherein X is an acryloyl terminated urethane group, $R^2$ is a divalent hydrocarbon group having from 1 to 20 carbon atoms, $R^3$ is an alkyl group having from 1 to 10 carbon atoms, and the value of m+n is from 10 to 500.

19. A method according to claim 18, wherein X is a group having the formula

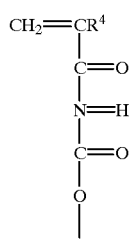

wherein $R^4$ is hydrogen or an alkyl group.

20. A method according to claim 15, wherein (B) is a polyethylene-polybutylene macromonomer having the formula:

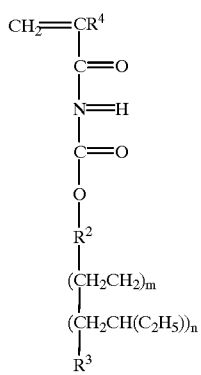

wherein $R^2$ is selected from the group consisting of ethylene propylene and butylene, $R^3$ is selected from the group consisting of methyl ethyl, propyl, n-butyl, sec-butyl, and tert-butyl, $R^4$ is hydrogen or methyl, the value of m+n is from 20 to 200.

21. A method according to claim 15, wherein (C) is selected from the group consisting of acryloxyalkyl-functional organopolysiloxanes, methacryloxyalkyl-functional organopolysiloxanes, and isopropenylbenzyl dialkyl urea-functional organopolysiloxanes.

22. A method according to claim 15, wherein (C) is an organopolysiloxane having the formula

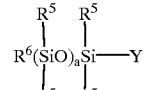

wherein $R^5$ is an alkyl group having from 1 to 20 carbon atoms, $R^6$ is an alkyl group having from 1 to 10 carbon atoms, a has a value test of at least 1, and Y is selected from the group consisting of an acryloxyalkyl group, a methacryloxyalkyl group, and an isopropenylbenzyl dialkyl urea group.

23. A method according to claim 22, wherein Y is a group having the formula

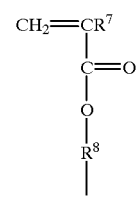

wherein $R^7$ is hydrogen or an alkyl group and $R^8$ is a divalent hydrocarbon group having from 1 to 20 carbon atoms.

24. A method according to claim 15, wherein (C) is an organopolysiloxane having the formula:

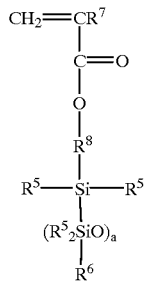

wherein $R^5$ is methyl, $R^6$ is selected from the group consisting of methyl, ethyl, propyl, n-butyl, sec-butyl, and tert-butyl, $R^7$ is hydrogen or methyl, $R^8$ is selected from the group consisting ethylene, propylene, and butylene, and a has a value of 1 to 300.

25. A method according to claim 15, wherein (D) is selected from the group consisting of peroxide initiators, azo initiators, redox intitiators, and photochemical initiators.

26. A method according to claim 25, wherein the peroxide initiator is selected from the group consisting of dibenzoyl peroxide, t-butyl peroctoate, dicumyl peroxide, diisopropyl peroxydicarbonate, and the azo initiator is 2,2-azobisisobutyronitrile.

27. A method according to claim 15, wherein (E) is selected from the group consisting of pentane, hexane, heptane, octane, nonane, benzene, toluene, xylene, acetone, methylethyl ketone, methylisobutyl ketone, trichloroethane, perchloroethylene, and bromobenzene.

28. A method according to claim 15, wherein the method comprises heating the mixture at a temperature 50 to 100° C.

* * * * *